United States Patent [19]

Goodier

[11] Patent Number: 5,408,888

[45] Date of Patent: Apr. 25, 1995

[54] LOAD MEASURING APPARATUS

[75] Inventor: Peter T. Goodier, New South Wales, Australia

[73] Assignee: SECA GmbH, Hamburg, Germany

[21] Appl. No.: 297,917

[22] PCT Filed: Mar. 23, 1990

[86] PCT No.: PCT/AU90/00118

§ 371 Date: Sep. 23, 1992

§ 102(e) Date: Sep. 23, 1992

[87] PCT Pub. No.: WO88/00334

PCT Pub. Date: Jan. 14, 1988

Related U.S. Application Data

[63] Continuation of Ser. No. 927,291, Sep. 23, 1992, abandoned.

[30] Foreign Application Priority Data

Mar. 23, 1989 [AU] Australia ............................ PJ3358

[51] Int. Cl.[6] ............................................. G01L 1/00
[52] U.S. Cl. ........................... 73/862.59; 177/210 FP
[58] Field of Search ......... 73/862.41, 862.59, DIG. 1; 177/210 FP

[56] References Cited

U.S. PATENT DOCUMENTS

| | | | |
|---|---|---|---|
| 3,595,329 | 7/1971 | Withwell et al. | 177/210 FP |
| 4,286,459 | 9/1981 | Trimmer et al. | 73/862.59 |
| 4,544,858 | 10/1985 | Nishiguchi et al. | 310/321 |
| 4,669,320 | 6/1987 | Simonsen | 73/862.59 |
| 4,773,493 | 9/1988 | Goodier | 177/210 FP |

FOREIGN PATENT DOCUMENTS

| | | |
|---|---|---|
| 67554/87 | 1/1987 | Australia . |
| 2448749 | 9/1975 | Germany . |
| WO88/00334 | 1/1988 | WIPO . |

Primary Examiner—Richard E. Chilcot, Jr.
Assistant Examiner—R. Biegel
Attorney, Agent, or Firm—Jacobson, Price, Holman & Stern

[57] ABSTRACT

An apparatus for measuring a force or load comprising a vibratory beam which vibrates back and forth at a resonant frequency. The beam has first and second end nodal points and first and second ends adjacent to the first and second nodal points. The first end of the vibratory beam is coupled to the load for applying a stress to the vibratory beam that determines the resonant frequency at which the beam vibrates. In addition, masses are coupled to the beam intermediate of the first and second ends. The masses are arranged symmetrically on opposite sides of the beam and reciprocate at the resonant frequency. The reciprocatory masses are located at a position along the beam at which the greatest back and forth vibration of the beam at the resonant frequency occurs. Alternatively, a pair of vibratory beams are provided. The beams are coupled together at opposite ends to form a tuning fork, each beam having a portion which vibrates back and forth at a resonant frequency. Masses are coupled to these portions of each of the beams, the masses being arranged symmetrically relative to each beam and reciprocating at the resonant frequency.

10 Claims, 3 Drawing Sheets

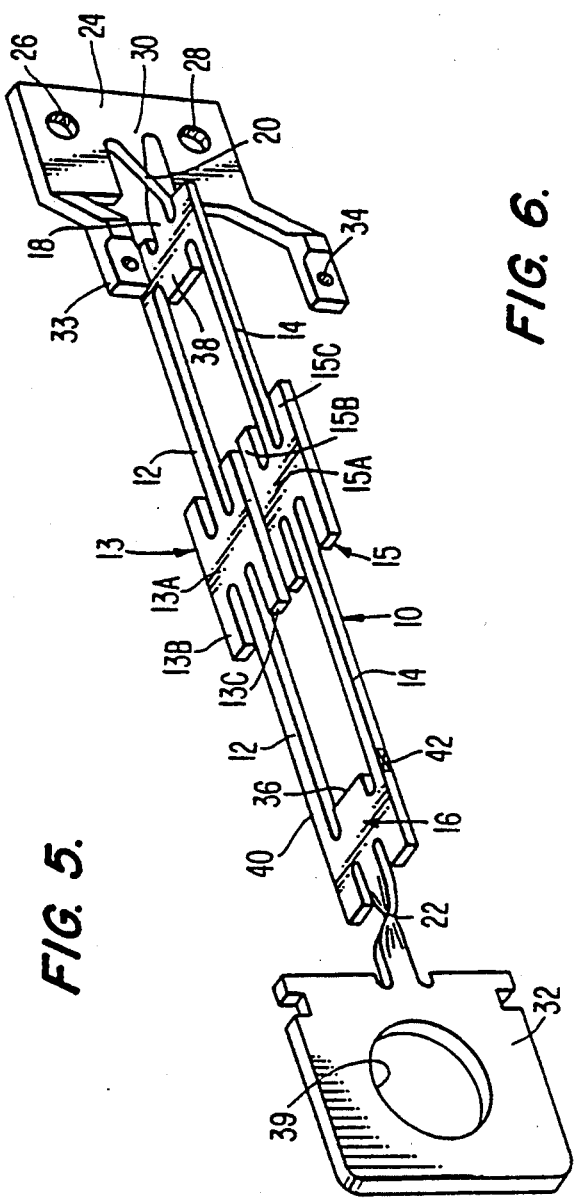
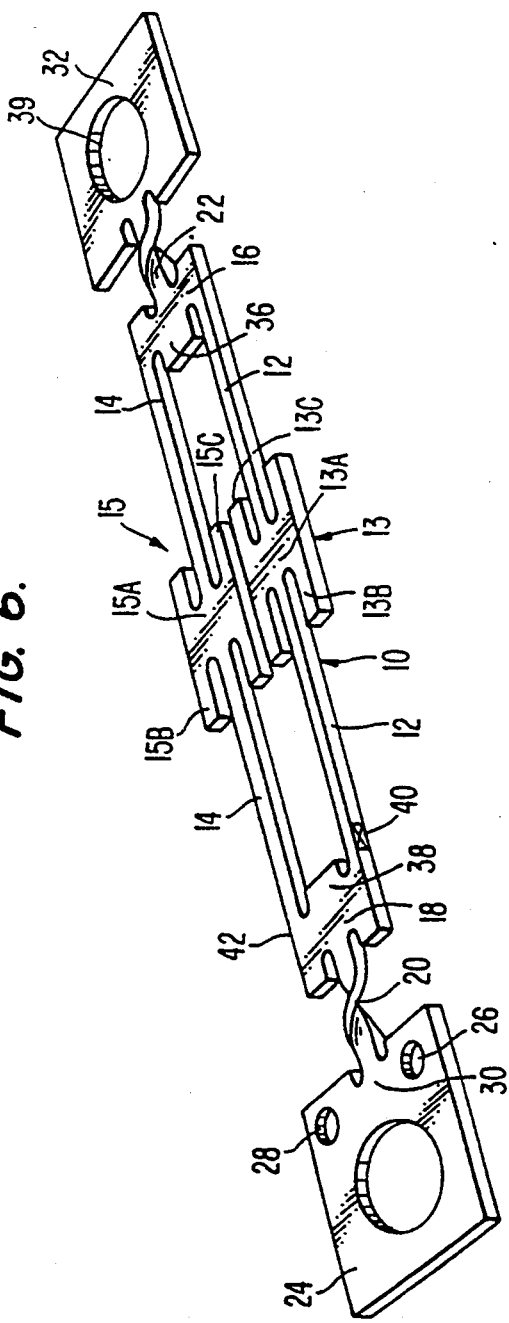
FIG. 5.
FIG. 6.

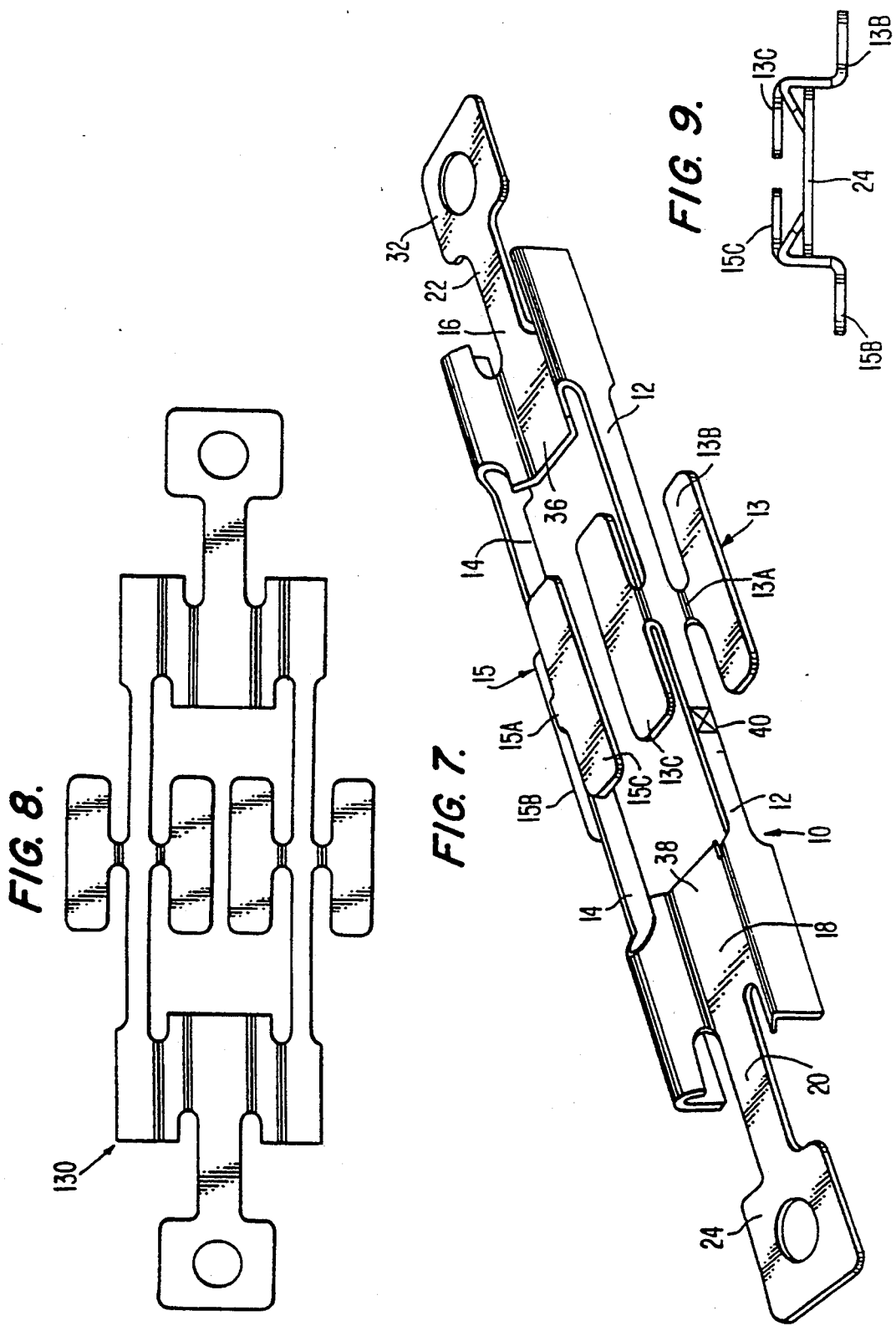

LOAD MEASURING APPARATUS

This is a continuation of application Ser. No. 07/927,291, filed Sep. 23, 1992 which was abandoned.

FIELD OF THE INVENTION

This invention relates to force or load measuring apparatus and in particular to apparatus which Incorporates a vibratory beam.

BACKGROUND OF THE INVENTION

Apparatus for measuring force or load by the use of vibratory beams are well known. In such apparatus a vibratory beam is excited and vibrates at particular frequencies related to the amount of stress applied to the vibratory beam. Frequency of vibration is also dependent upon the stiffness of the beam. Such apparatus provide substantial advantages in that construction is simple and analogue-to-digital converters are not required because a digital value is directly produced in such apparatus.

In my U.S. Pat. No. 4,734,931 disclose force measuring apparatus wherein mechanical Q is high so that oscillations can be maintained in the vibratory beam whereby smaller sources of external energy are required to excite the beam. In my aforesaid patent the force measuring apparatus comprises a vibratory beam which vibrates back and forth at a measurement frequency and which includes a rotational mass coupled to the beam at an internal nodal point which does not vibrate back and forth at the measurement frequency but wherein the rotational mass rotates at the measurement frequency.

SUMMARY OF THE INVENTION

The present invention aims to provide force or load measurement apparatus which incorporates a vibratory beam and which is at least an alternative to the apparatus disclosed in my above U.S. Patent and which functions efficiently for the measurement of load or force. Other features of the apparatus will become apparent in the following description.

The present invention thus provides apparatus for measuring a load or force comprising a vibratory beam which vibrates back and forth at a measurement frequency said beam having first and second end nodal points and first and second ends adjacent said first and second nodal points, means for coupling said first end of the vibratory beam to said load for applying a stress to said vibratory beam that determines the measurement frequency at which said beam vibrates and a mass coupled to said beam intermediate said first and second ends, said mass reciprocating at said measurement frequency.

Preferably the reciprocatory mass is located at a position along said beam wherein the greatest vibration of said beam back and forth at the measurement frequency occurs. Alternatively, said beam may include one or more intermediate nodal points and a plurality of masses are coupled to said beam intermediate the respective said nodal points so as to reciprocate at the measurement frequency.

In a further aspect, the apparatus comprises a pair of parallel beams which are coupled together at their opposite ends to form a tuning fork, each said beam having a central point which vibrates back and forth at the measurement frequency and wherein respective masses are coupled to the respective said central points so as to reciprocate at said measurement frequency.

BRIEF DESCRIPTION OF THE DRAWINGS

The accompanying drawings, which are incorporated in and constitute a part of the specification, illustrate preferred embodiments of the invention and, together with the description, serve to explain the principles of the invention.

FIGS. 5 to 8 illustrate practical embodiments of the invention; and

FIG. 9 is an end view showing details of the masses of the embodiment of FIG. 7.

DESCRIPTION OF THE PREFERRED EMBODIMENTS

Figure 1:
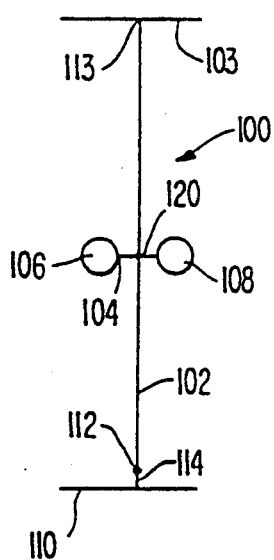
FIG. 1 is a schematic view of a force (load) sensor according to the invention comprising a vibratory beam provided with a reciprocatory mass intermediate its ends.
Figure 2:
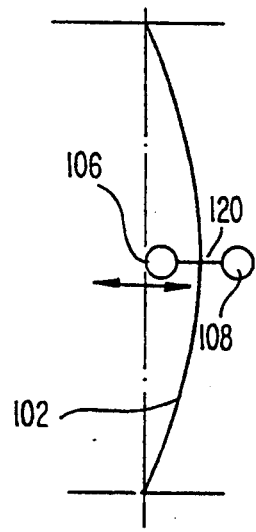
FIGS. 2 and 3 illustrate the operation of the vibratory beam of the invention.
Figure 3:
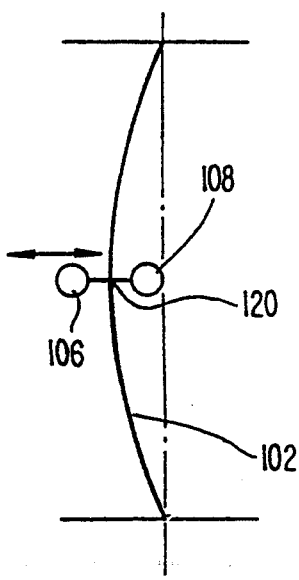

Referring to the drawings and firstly to FIGS. 1 to 3, there is illustrated schematically a force sensor 100 according to the invention which includes a vibratory beam or bar 102. The vibratory beam has a first end 112 and a second end 113. Preferably, the second, or mounted, end 113 of the vibratory beam 102 is attached to a mounting means 103 for securing the second end 113 of the vibratory beam 102.

Support means 110 are suitably provided for supporting the force (weight) to be measured. The invention includes means for coupling the first end 112 of the vibratory beam 102 to the support means 110 for applying a stress to the vibratory beam 102 that determines the measurement frequency at which the beam 102 vibrates. As embodied herein, a weight to be measured is hung on the support means 110, which is coupled to first end 112 of the vibratory beam by coupling means 114. As a result, the weight applies a stress to vibratory beam 102 that is proportional to the resonant frequencies at which the beam will vibrate when excited.

The invention includes a mass coupled to the vibratory beam 102 that reciprocates at the measurement frequency. As here embodied, an arm member 104 extends at right angles to the vibratory beam 102, and the free ends of the arm are attached to spherical masses 106 and 108. Arm member 104 in FIG. 1 couples masses 106 and 108 to point 120 along the vibratory beam 102 which is positioned centrally of the opposite ends of the beam 102 so that the masses 106 and 108 are subject to maximum vibration.

The vibratory beam mass combination has a fundamental resonant frequency at which it can vibrate, which is dependent on the length, cross-section, and stiffness of the vibratory beam, on the weight of the mass and the distance the mass is located along the beam, and on the stress applied to the vibratory beam by the force (weight) being measured. At the fundamental resonant frequency, maximum vibration back and forth occurs at the central point 120 of the vibratory beam and most suitably the masses 106 and 108 are coupled to this point.

Vibratory beam 102 may be formed of a piezoelectric type material, such as quartz. In the preferred embodiment, however, vibratory beam 102 is formed of a nonpiezoelectric materia, for example a suitable metal, such as beryllium copper. When a piezoelectric material is not used in forming the vibratory beam 102, a piezoelectric driver (not shown) is preferably mounted on vibratory beam 102 to excite the vibratory beam 102 and cause it to vibrate. When all other factors are kept constant, the force (weight) being applied to the beam 102 can be measured using a piezoelectric receiver (not shown) acting as a vibration pick-up element, because the frequency of vibration of beam 102 will be proportional to the force applied by the weight on support means 110 coupled to first end 112 of the beam.

Preferably, the coupling means directly connects the first (free) end of vibratory beam 102 to support means 110. However, stress can be applied to free end 112 of the vibratory beam 102 using a lever arrangement, particularly when vibratory beam 102 is formed of a fragile material, such as quartz, which typically cannot support weights above 1-2 kilograms.

As shown in FIGS. 1-3, the masses coupled to the central point in the present invention respond to vibration of the vibratory beam 102. FIGS. 2 and 3 illustrate schematically the reciprocatory motion, with the movements being greatly exaggerated in order to assist in understanding the operation of the invention. The reciprocatory masses are coupled to the vibratory beam 102 in order to become a dominant factor in determining the precise measurement frequency at which vibratory beam 102 will vibrate. As the beam oscillates from one phase to the next, this causes the masses coupled to the point 120 along the vibratory beam 102 to reciprocate back and forth.

Figure 4:
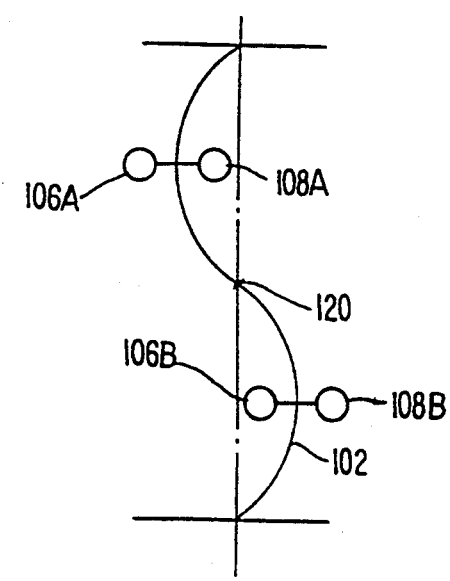
FIG. 4 illustrates schematically a further form of force (load) sensor according to the invention.

In the embodiment of FIG. 4, the vibratory beam 102 is shown vibrating at the second harmonic of the fundamental resonant frequency, that is approximately twice the frequency of the fundamental. In this case, nodal points are located at the opposite ends of the beam and at a position 120' in the middle of the beam 102 whilst maximum vibration of the beam occurs at two positions intermediate the middle and opposite end nodal points. Pairs of masses 106A and 106B, and 108A and 108B are coupled to the beam 102 at both points of maximum vibration so as to reciprocate back and forth at the resonant frequency. A similar arrangement can be used at different harmonics of the resonant frequency with the masses coupled to the beam between the nodal points so as to reciprocate upon beam vibration.

Use of a mass or masses coupled to the maximum vibration point or points of a vibratory beam provides significant advantages for the apparatus of the present invention over conventional vibration type apparatus. Most importantly, a dramatic rise in Q is obtained because the resonant frequency of the vibratory beam is now determined by both the parameters for the vibratory beam and those for the reciprocatory masses. The ratio of energy stored to energy lost by the system is increased because the reciprocatory masses acts as a mechanical flywheel that absorbs any energy spikes, and enhances the ability of the sensor to resist any changes in frequency that would be induced by short term influences from either internal or external sources. The apparatus of the present invention exhibits an order of magnitude improvement in Q over apparatus manufactured by moulding or using a press tool in which no masses are used. Another important advantages is the sizeable relaxation in manufacturing tolerances that occurs, resulting in apparatus having the same Q as conventional apparatus but which can be produced much more conveniently and at lower cost. This relaxation in tolerances is due to the fact that the resonant frequency is dramatically influenced by the presence of the masses exhibiting the reciprocatory motion so that the vibratory beam in itself is no longer the crucial factor in determining the resonant frequency of the sensor.

The practical embodiments described in my aforesaid U.S. Pat. No. 4,773,493 may also be applied to the present invention and accordingly the contents of the specification of that patent are hereby incorporated into this specification by reference. In this case, however, the rotational masses constitute masses that reciprocate in a direction transverse to the length of the beams in a manner described with reference to FIGS. 1 to 4.

Such embodiments of force sensor are shown in FIGS. 5 to 9 wherein the vibratory beams are in the form of a pair of parallel members 12 and 14 which are coupled together at opposite end portions 16 and 18 and which form a tuning fork. When the sensor is vibrated at the fundamental frequency, the members 12 and 14 will vibrate at a maximum at a central point along the members with null nodal points being located at opposite ends of the members 12 and 14.

Reciprocatory masses 13 and 15 are coupled to the central points of the respective members 12 and 14 by arm members 13A and 15A and each mass including the arm members 13A and 15A in these embodiments is in the form of an H-section.

So as to cancel unwanted vibrations in the end portions 16 and 18, the latter are provided with respective inwardly directed protrusions 36 and 38 which serve to increase the Q of the sensor.

Load is preferably directly coupled to the force sensor via a load plate 32 which is connected to the end portion 16 of the sensor via a longitudinal extension 22. At the opposite end, the sensor is coupled through a further longitudinal extension 20 to a mounting plate 24 for mounting of the sensor. The extensions 20 and 22 serve to isolate the mounting plate 24 and the load plate 32 from the oscillating members or beams 16 and 18. This minimizes any dampening of the oscillation of the members 16 and 18.

The load plate 32 includes a hole 39 which facilitates connection of a load. Thus when used for weight measurement, the weight to be measured may be hung directly from the load plate 32 via the hole 39. Thus a weighing pan suspended by a hook may be attached to the load plate 32. The 90 degree twists formed in the extension 22 serve to even out the load applied to the two beams or members 12 and 14. A similar twist is formed in the extension 20 for the same purpose. The mounting plate 24 of the embodiment of FIG. 4 is of generally C-shaped form so as to facilitate its rigid securement to any device.

In an alternative manner of usage of the invention, the mounting plate 24 and load plate 24 may be secured at spaced apart positions to a member subject to stress, the stress being transferred to the sensor which serves to sense stress applied to the member.

So as to sense the vibration frequency of the sensor, a piezoelectric receiver 42 is mounted on the vibratory beam 14 whilst a piezoelectric driver 40 is preferably coupled to the other beam 12. When a pulsed input is applied to the driver 40, the driver 40 and the beam 12 will vibrate, the pulse signal being timed to maintain the beam 12 vibrating at a resonant frequency. The vibration in the beam 12 results in a vibration out of phase in the other beam 14. This latter vibration is sensed by the receiver 42 and the detected signal having the same frequency as the vibration frequency of the beams 12 and 14 is phase adjusted and fed back to the driver 40 resulting in a system which oscillates at a particular frequency.

The resonant frequency varies in proportion to the stress applied to the sensor by the force (weight) being measured. Suitably, microcomputer means are coupled to the piezoelectric receiver and responsive to the output signals generated thereby for determining the size of the force of load. Typically, the microcomputer includes a microprocessor and counter are used to measure the frequency at which the beams are vibrating so as to provide a measurement of applied stress or load.

Preferably, the piezoelectric receiver and driver are coupled to the beams at the point of maximum frequency. When the beams are excited at the fundamental, the greatest amount of vibration occurs at the centre of the beams.

FIGS. 7 to 9 illustrate an alternative embodiment of the invention similar to that of FIGS. 4 and 5 and wherein like components have been given like numerals. In this embodiment, the sensor is formed from a metal blank such as beryllium copper sheet using a press tool and the masses 13a and 13b and 15a and 15b are offset from each other on the opposite sides of their respective beams 12 and 14. The beams 12 and 14 are also oriented at right angles to the beams of FIGS. 4 and 5 however no change in performance results.

The reciprocatory masses or weights may be made in a variety of forms and may be coupled to the vibratory beams in a number of ways. Furthermore, the weights need not be coupled to the maximum vibratory points of the beams but may be coupled at any position along the beams where they will reciprocate.

The reciprocatory masses may be a wide variety of shapes and sizes although it is preferably for the masses coupled to a pair of vibratory beams to be fairly symmetrical to each other.

In a further application of the invention, the force sensor may be used in a similar manner to a strain gauge so as to measure load on a member. In this case, opposite ends of the force sensor are secured to the member at spaced apart positions so that any load on the member is transmitted to the force sensor, the latter varying in vibration frequency in accordance with applied load.

All such variations and modifications to the invention as would be apparent to persons skilled in the art are deemed to fall within the broad scope and ambit of the invention as herein set forth.

I claim:

1. An apparatus for measuring a force or load comprising a vibratory beam which vibrates back and forth at a resonant frequency, said beam having first and second end nodal points and first and second ends adjacent said first and second nodal points, means for coupling said first end of said vibratory beam to said load for applying a stress to said vibratory beam that determines the resonant frequency at which said beam vibrates and masses coupled to said beam intermediate said first and second ends, said masses being arranged symmetrically on opposite sides of said beam, said masses reciprocating at said resonant frequency, wherein said reciprocatory masses are located at a position along said beam at which the greatest back and forth vibration of said beam at the resonant frequency occurs.

2. An apparatus according to claim 1 wherein said beam has a plurality of said nodal points and wherein said masses are respectively coupled to said beam at positions intermediate said nodal points to reciprocate at said resonant frequency upon vibration of said beam.

3. An apparatus according to claim 1 and including a pair of substantially parallel vibratory beams, said beams being coupled together at opposite ends to form a tuning fork, each beam having a central point which vibrates back and forth at the resonant frequency and wherein said masses are respectively coupled to the said central points so as to reciprocate at said resonant frequency.

4. An apparatus for measuring a force or load, said apparatus including a vibratory beam, means for causing said vibratory beam to vibrate at a fundamental frequency, said beam having a point of maximum vibration intermediate its ends, masses coupled to said vibratory beam symmetrically about said beam, said masses reciprocating at said resonant frequency when said vibratory beam is vibrated, and means for applying said force or load to said vibratory beam, said frequency of vibration varying proportionally to said applied force or load, wherein said reciprocatory masses are located at a position along said beam at which the greatest back and forth vibration of said beam at the resonant frequency occurs.

5. An apparatus for measuring a force or load, said apparatus including a pair of vibratory beams, said beams being coupled together at opposite ends to form a tuning fork, each beam having a portion which vibrates back and forth at a resonant frequency, masses coupled to said portions of each of said beams, said masses being arranged symmetrically relative to each beam, said masses reciprocating at said resonant frequency, support means for supporting a force or load to be measured, and means for coupling one end of said vibratory beams to said support means for applying a stress to said vibratory beams which determines said resonant frequency at which said beams vibrate, wherein said reciprocatory masses are located at a position along said beams at which the greatest back and forth vibration of said beams at the resonant frequency occurs.

6. An apparatus according to claim 5 wherein said portions of said beams are located centrally relative to opposite ends of said beams.

7. An apparatus for measuring a force or load, said apparatus including a vibratory beam which vibrates back and forth at a resonant frequency, said beam having first and second nodal points and a portion located between said nodal points at which said beam vibrates at said resonant frequency, means for causing said vibratory beam to vibrate at said resonant frequency, masses coupled to said beam at said portion between said nodal points, said masses being arranged symmetrically on opposite sides of said beam, said masses reciprocating at said resonant frequency and means for applying said force or load to be measured to said beam, said resonant frequency varying in accordance with said applied force or load wherein said reciprocatory masses are located at a position along said beam at which the greatest back and forth vibration of said beam at the resonant frequency occurs.

8. An apparatus according to claim 7 and including support means for supporting said load or force to be measured and means for coupling a first end of said beam to said support means.

9. An apparatus according to claim 1 and including a piezoelectric receiver coupled to said vibratory beam for generating output signals at said resonant frequency at which said vibratory beam is vibrating back and forth.

10. An apparatus according to claim 9 and including a piezoelectric driver coupled to said vibratory beam, said driver causing said vibratory beam to vibrate upon receipt of input signals.

* * * * *